INVENTOR
WILLIAM H. DRAKE
BY Mason, Fenwick & Lawrence
ATTORNEYS

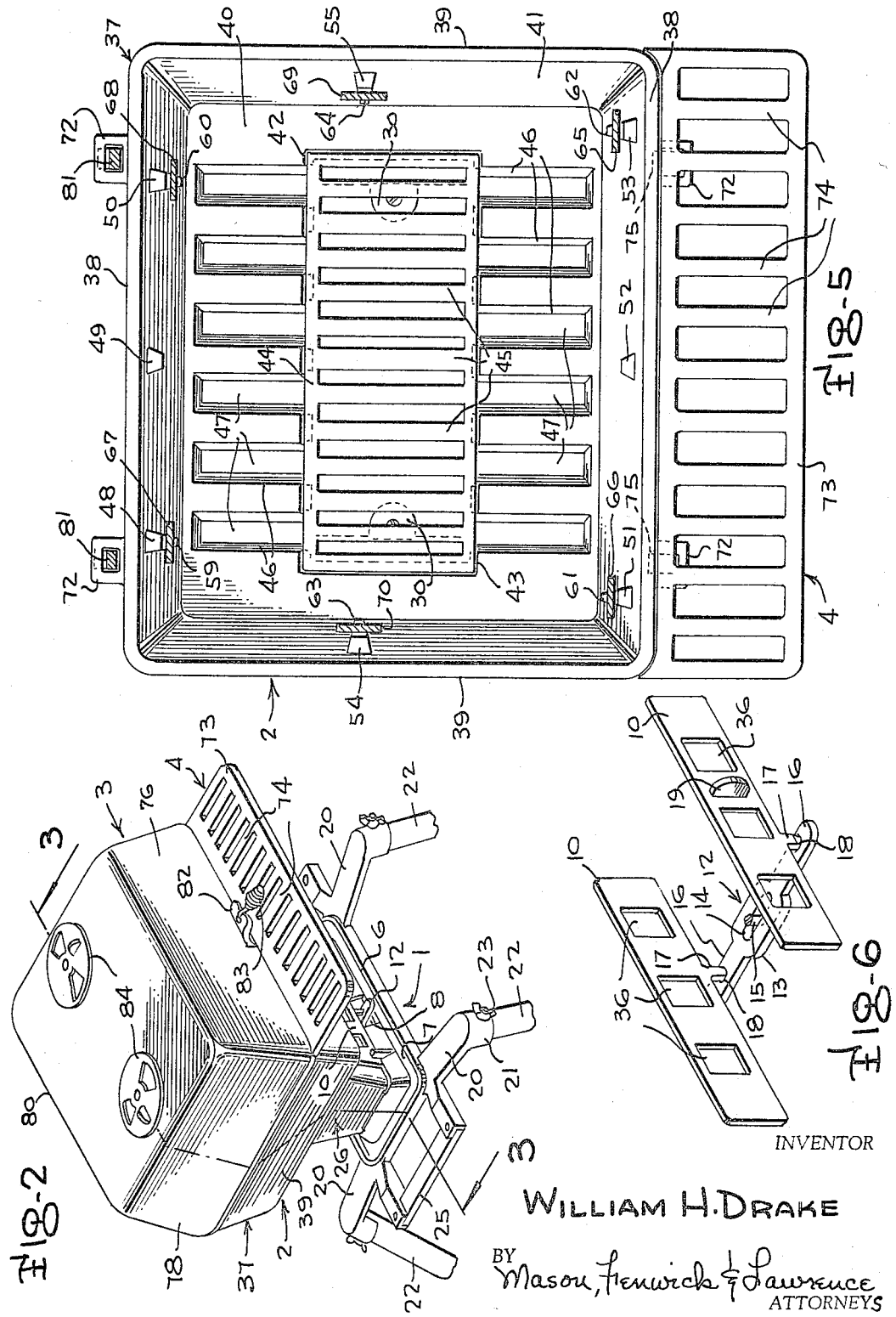

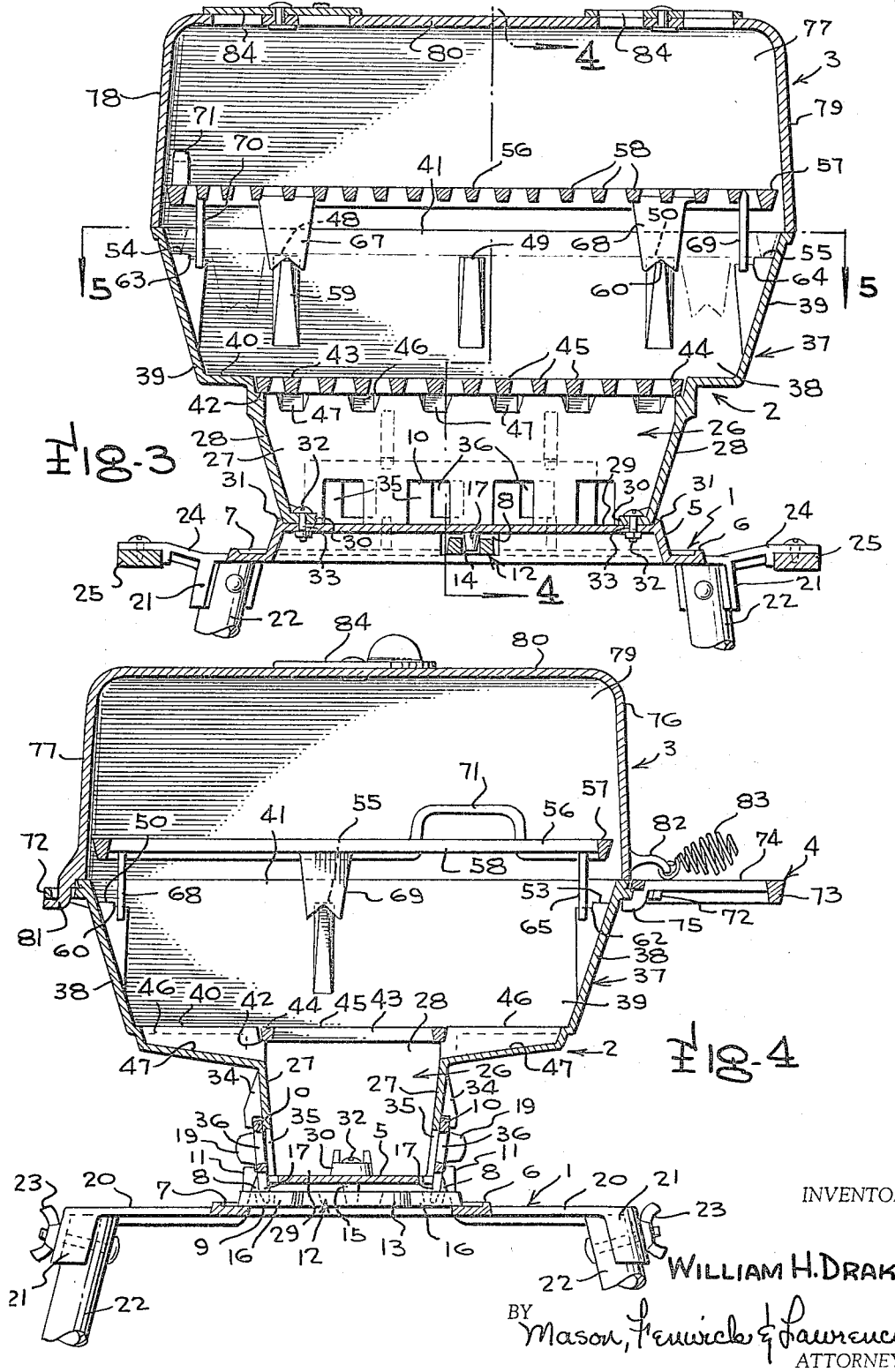

3,285,239
GRILL
William H. Drake, 116 Presley St., Rome, Ga.
Filed Oct. 22, 1964, Ser. No. 405,712
3 Claims. (Cl. 126—25)

Portable grills of many types are available on the market, but with most of them there have been problems in one, or more, areas, including proper draft and draft control, grease accumulation and disposal, and grill height adjustments. The majority of the currently known grills are formed of sheet metal, and must be handled with care to avoid denting, warping or twisting, etc.

The general object of the present invention is to provide a rugged grill having greatly improved operating characteristics.

A more specific object is the provision of a portable grill which is composed of a plurality of easily assembled, cast elements which interfit to provide an efficient unit.

Another object is to provide a grill of this type which embodies means to cause grease drippings, condensed moisture, etc. to follow a prescribed flow path to an accumulating channel from which the liquid may flow through outlets to a collector placed beneath the grill.

A further object is the provision of a grill having improved draft means and draft control.

It is also an object of the invention to provide a portable grill with a novel structural arrangement to enable placement of the food-supporting grid at different heights above the fire bed.

Other objects of the invention will become apparent from the following description of one practical embodiment thereof, when taken in conjunction with the drawings which accompany, and form part of, this specification.

In the drawings:

FIGURE 2 is a perspective view of the assembled grill;

FIGURE 3 is a vertical, longitudinal section through the grill, taken substantially on the line 3—3 of FIGURE 2;

FIGURE 4 is a vertical, transverse section through the grill, taken on the line 4—4 of FIGURE 3;

FIGURE 5 is a horizontal section taken on the line 5—5 of FIGURE 3; and

FIGURE 6 is a perspective view of the dampers, and damper control used on the base of the grill.

Figure 1:
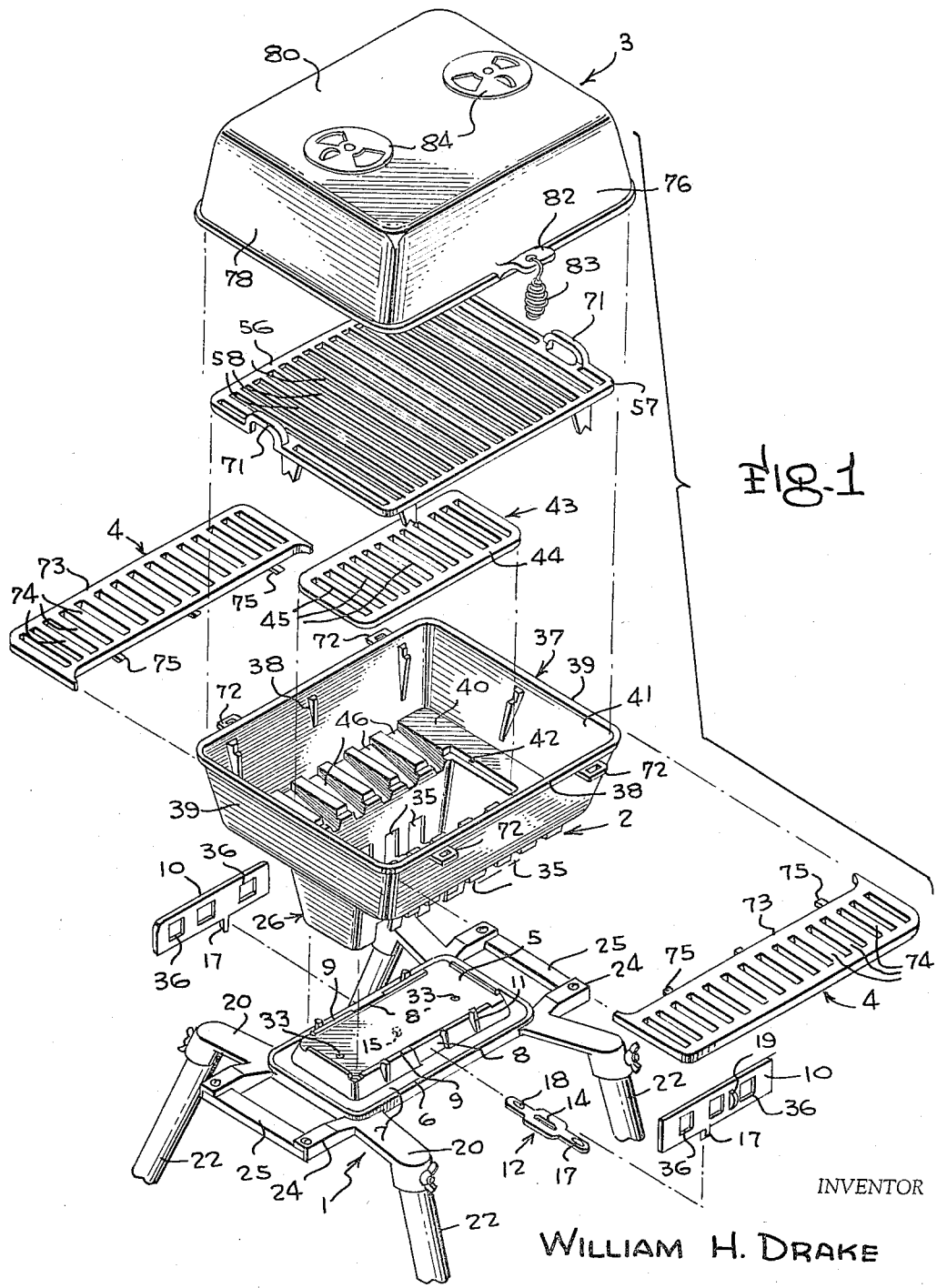
FIGURE 1 is a perspective view of all of the components of a portable grill embodying the principles of the present invention, the parts being shown unassembled and separated for clarity.

Referring to the drawings in detail, the grill is composed of a number of principal parts including, a base 1, a combined fire bowl and ash basin 2, a hood 3, and one, or more, shelves 4. These are assembled, as will be described, to complete the grill.

Base 1 is a cast unit of generally rectangular shape. It has a central, raised platform 5, and a perimetral bead 6. Intermediate the platform and bead, there is a recess extending completely around the base and framing the platform, to form a grease-receiving channel 7. Openings 8, midway of the lengths of the side of the platform, provide outlets through which grease may drain from channel 7 into containers (not shown) which may be placed beneath the base.

Extending along the front and back edges of the platform are raised ledges 9 that form damper slides, or tracts, upon which damper plates 10 are supported and moved. Bosses 11 project upwardly from the platform sides, above the damper slides to serve as damper plate-retaining members. The front and rear damper plates are interconnected for simultaneous movement by a tie link 12 having a central portion 13, slotted at 14 to receive a stud 15 projecting downwardly from the bottom of the base platform, about which the link may pivot. The link has opposed arms 16 projecting from the central portion to extend through the grease outlets 8 in the platform side walls. The link may have one arm inserted through one drain opening 8 and then moved into position against the platform bottom with stud 15 projecting through slot 14. The link can then be moved lengthwise to project the other arm through the outlet 8 at the other side of the platform. Thus, the link will be pivotally mounted with its arms projecting through the opposed outlets 8. The damper plates each have depending pins 17 which fit into openings 18 in the link arms when the damper plates are positioned on the damper slides. By this arrangement, the damper plates will be tied together for simultaneous movement in opposite directions. Each damper has a finger piece 19 by which it can be moved along its track.

At each corner of base 1, there is an outwardly projecting leg mounting member 20. Each member 20 terminates in a cuff 21 into which a leg 22 may be inserted. Wing bolts 23 can be used to secure the legs in the cuffs. This construction broadens the grill base to provide increased stability. Handle mounts 24 project from the leg mounts so that pairs of spaced mounts are provided at each end of the base. Handles 25 of wood, or other low thermal conduction material, are secured between the mounts.

The combined fire bowl and ash basin casting 2 seats upon the base 1, the ash basin 26, which is the lower portion of the combined casting, has downwardly converging front and back walls 27 and end walls 28. The bottom 29 of the ash basin is open except at the ends where short horizontal inwardly extending ears 30 are provided. The lower perimeter of the ash basin is of such size and shape that it fits upon platform 5 of the base 1, being centered on the platform by means of end stops 31 formed on the platform. Bolts 32, through ears 30 and holes 33 in the base platform, secure the casting 2 to the base.

The ash basin front and back walls 27 have retaining fingers 34 that overlie the upper edges of damper plates 10, when the casting 2 is fixed to the base, to lock the damper plates in position on the slides 9. These walls are also slotted, as at 35, to form draft inlets in the area covered by the damper plates. Openings 36, similarly spaced to slots 35, are provided in the damper plates to register with slots 35 for full draft, or to move away from the slots to shut off the draft. The two damper plates are arranged with respect to the slots in the front and back walls so that they open and close in unison and to the same degree.

The upper, fire bowl section 37 of casting 2, is considerably longer and wider than the lower, ash basin 26. It, also, has downwardly converging front and back walls 38 and end walls 39. The fire bowl has a partial bottom, extending as a rim 40 about the open top 41 of the ash basin. A seat 42 is formed along the upper edges of the front, back and end walls 27 and 28 of the ash basin to provide a perimetric support for a grate 43. The grate is cast in the form of a frame 44 with spaced grate bars 45. When the grate is in place on seat 42 its upper surface is flush with the rim 40.

Those portions of the rim-like bottom 40 of fire bowl 37 which lie intermediate the respective front and back walls of the fire bowl and ash basin each contain a plurality of grooves 46 extending from the base of the fire bowl wall to the top of the basin wall. The grooves have bottoms 47 which decline from the fire bowl walls to the ash basin walls and the grooves open to the ash basin below the grate 43. Thus, grease or condensate in the fire bowl will drain along grooves 46 into the ash basin and out of the ash basin through slots 35 into channel 7. From channel 7, the grease will flow out the grease outlets 8 into suitable collecting containers.

Referring particularly to FIGURES 3, 4 and 5, it will be noted that the front wall of the fire box has cast lugs 48, 49 and 50, the back wall has lugs 51, 52 and 53, and the end walls have lugs 54 and 55, respectively. These lugs have top surfaces which are spaced from the fire bowl top equal distances, to form perches upon which a food grid 56 can seat. The lugs underlie the frame 57 of the grid, and grid bars 58 between the frame ends form a food-supporting surface. The grid will be firmly seated on the perches with its top surface substantially flush with the fire bowl top. It will be noted, that perches 51 and 53 are spaced apart a greater distance than perches 48 and 50, and that the end perches 54 and 55 are both to one side of the longitudinal center line of the fire bowl. The grid 56 has support legs depending from it for cooperation with additional seats 59 and 60 on perches 48 and 50, seats 61 and 62 on perches 51 and 53, and seats 63 and 64 on perches 54 and 55. When the grid is oriented to seat on perches 48 to 54, inclusive, the support legs of the grid will not contact the seats 59 to 64, inclusive, because of the different spacing between the legs and seats. Legs 65 and 66 will lie outside seats 59 and 60, for they are spaced apart a distance equal to the spacing between seats 61 and 62. Legs 67 and 68 will lie inside seats 61 and 62 for they are spaced apart a distance equal to the spacing between seats 59 and 60. Legs 69 and 70 are spaced from the longitudinal center line of the grid a distance equal to the spacing of the seats 63 and 64 from the center line of the fire bowl, but on the opposite side of the vertical plane common to the center lines of the grid and fire bowl. Thus, none of the legs will contact the seats and the grid frame will seat on the perches as described. If, however, the grid is removed and turned end-for-end, each of the legs 67 to 70, inclusive, will contact one of the seats 59 to 64, inclusive, so that the grid will be supported by the legs, and the legs, in turn, will be supported by the seats. Due to the length of the legs, the grid will be positioned above the top of the fire bowl. The grid may have handles 71 for ease in handling.

There are several cast hinge loops 72 about the top of the fire bowl 37. Two are shown projecting rearwardly from the back wall, and two forwardly from the front wall. Shelves, such as the shelf 4, may be connected to the fire bowl front and rear, if desired, to increase the work space. As shown, however, a shelf may be attached to the front wall and the hood 3 to the back wall. Shelf 4 is a cast member, similar to the grid and grate in construction, having a frame 73 and support bars 74. Engaging fingers 75 project from the rear edge of the shelf for interengagement with loops 72 to secure the shelf in place.

The hood 3 may be any desired shape, and is shown as having a front wall 76, back wall 77, end walls 78 and 79, and top wall 80. The back wall has hinge fingers 81 to engage loops 72 on the fire bowl back wall, and the front wall has a lifting lip 82 to which a spring type handle 83 may be attached for ease in lifting and lowering the lid. The lid will be held in fully raised position by the ends of hinge fingers 81 striking the back wall of the fire bowl. In order that a draft may be maintained when the hood is lowered, adjustable dampers 84 are provided in the hood top wall 80.

When the grill is to be used, the hood 3 will be raised and the grid 56 lifted from the fire bowl. Fuel, such as charcoal briquets, will be placed within the fire bowl upon the grate 43 and ignited. One of the damper plates 10 will be moved to uncover the draft openings 35 in the ash basin, and, of course, through link 12, the other damper plate will be similarly moved. Grid 56 will now be replaced with the grid frame resting on the perches 48 to 55, inclusive, if a quick cooking is desired, or rotated 180° to cause the support legs 65 to 70, inclusive, to rest upon respective seats 59 to 64, inclusive, to raise the grid if slower cooking is desired. When the fire has reached cooking heat, the dampers may be adjusted for proper cooking burning, the food placed upon the grid, and the hood lowered. Of course, dampers 84 in the hood can be adjusted to maintain the proper draft.

It will be evident that the elevation of the grid can be changed when desired by merely lifting the grid, turning it end-for-end, and replacing it in the fire bowl. Proper draft may be maintained with air entering from both sides of the ash basin by adjusting but one damper. Grease from the cooking food will fall through the grid into the fire bowl rim 40 and down grooves 46 into the ash basin. From there the grease will flow into channel 7 for collection. Thus, grease and condensate form no problem by collection in the fire bowl or through saturation of the ashes in the ash basin.

While in the above one practical embodiment of the invention has been disclosed, it will be understood that the details of construction shown and described are merely by way of illustration and the invention may take other forms within the scope of the appended claim.

What is claimed is:

1. A portable grill comprising, a cast base, a cast combined ash basin and fire bowl in superimposed relation removably attached to the base, a grate at the horizontal plane of juncture of the ash basin and fire bowl, a grid and cooperating means on the fire bowl and grid to support the grid at the top of the fire bowl, the ash basin having an open top and the fire bowl having a partial bottom forming a horizontal rim about the top of the ash basin, said grate bridging the top of the ash basin to complete the fire bowl bottom, the horizontal rim having grooves therein opening to the ash basin below the grate, whereby grease and condensate in the fire bowl may drain to the ash basin, a channel in the base about the lower end of the ash basin, openings in the ash basin through which grease and condensate may flow from the ash basin to the channel, and at least one drain outlet from the channel.

2. A portable grill as claimed in claim 1 wherein, the openings in the ash basin are on opposite sides of the ash basin at the bottom and are draft openings, damper plates mounted for sliding movement over the openings in the ash basin, and means interconnecting the damper plates to cause the damper plates to move in unison.

3. A portable grill as claimed in claim 2 wherein, the means to support the grid comprises, legs on the underside of the grid with the legs on one side of the grid staggered relative to the legs on the other side of the grid, and two sets of grid supports on opposite sides of the fire bowl, the supports of one set having locations similar to the locations of the legs of the grid to seat the legs and support the grid at one elevation when the grid is in one position, the supports of the other set being engageable with the underside of the grid when the grid is rotated 180° from the said one position to support the grid at another elevation.

References Cited by the Examiner

UNITED STATES PATENTS

| | | | |
|---|---|---|---|
| 2,314,791 | 3/1943 | Jones et al. | 126—25 |
| 2,940,381 | 6/1960 | Cottongim et al. | 99—445 |
| 3,027,887 | 4/1962 | Krohncke | 126—25 |
| 3,051,159 | 8/1962 | Hardy | 126—25 |
| 3,085,562 | 4/1963 | Persinger et al. | 126—25 |

FREDERICK L. MATTESON, Jr., Primary Examiner.

E. G. FAVORS, *Assistant Examiner.*